United States Patent [19]

Miyakawa et al.

[11] Patent Number: 5,223,954
[45] Date of Patent: Jun. 29, 1993

[54] SYSTEM FOR PRODUCING A HALFTONE FILM OR A PRINTING PLATE

[75] Inventors: Tadashi Miyakawa; Shinji Ito, both of Kaisei, Japan

[73] Assignee: Fuji Photo Film Co., Ltd., Kanagawa, Japan

[21] Appl. No.: 574,190

[22] Filed: Aug. 29, 1990

[30] Foreign Application Priority Data

Sep. 8, 1989 [JP] Japan .................. 1-233992

[51] Int. Cl.$^5$ .............................. H04N 1/46
[52] U.S. Cl. ..................... 358/474; 358/75; 358/451; 358/449; 382/63
[58] Field of Search ............ 382/62, 63; 358/449, 358/459, 452, 487, 444, 78, 451, 497, 75

[56] References Cited

U.S. PATENT DOCUMENTS

| | | | |
|---|---|---|---|
| 4,591,904 | 5/1986 | Urabe et al. | 358/452 |
| 4,692,796 | 9/1987 | Yamada et al. | 358/78 |
| 4,827,526 | 5/1989 | Matsumoto | 358/449 |
| 4,922,350 | 5/1990 | Rombola et al. | 358/449 |

FOREIGN PATENT DOCUMENTS

| | | |
|---|---|---|
| 0106291 | 4/1984 | European Pat. Off. . |
| 0246010 | 11/1987 | European Pat. Off. . |
| 0265362 | 4/1988 | European Pat. Off. . |
| 0310891 | 4/1989 | European Pat. Off. . |
| 0377386 | 7/1990 | European Pat. Off. . |
| 57-092348 | 8/1982 | Japan . |
| 0185569 | 11/1982 | Japan .................. 358/452 |
| 59-67768 | 4/1984 | Japan . |
| 2182821 | 5/1987 | United Kingdom . |

OTHER PUBLICATIONS

Patent Abstracts of Japan, vol. 6, No. 175 (P-141), Sep. 9, 1982; (Fuji Xerox Co., Ltd.) Aug. 6, 1982, entitled "Slit Switching Mechanism".

Kerchmar "Selective Rescanning..." *IBM Tech Discl. Bull.* vol. 22 No. 10 Mar. 1980.

*Primary Examiner*—Edward L. Coles, Sr.
*Assistant Examiner*—Jill Jackson
*Attorney, Agent, or Firm*—Sughrue, Mion, Zinn, Macpeak & Seas

[57] ABSTRACT

A color original such as a color reversal film and the like which may be different size (for example, the Brownie, 4"×5", 35 mm) is fitted or stored in the original cassette mounted on the cassette base. The original is read to obtain a whole image data by a transmission type or a reflection type image sensor without catching any flare, and an auxiliary scanning is done sequentially on lines of the original, reading the whole surface thereof, so as to output directly the plates of C,M,Y and black (K). Because of the procedure described above the operation to produce the plates is easily done at a high speed by even an unskilled operator. The operation for scanning the original image comprises the steps of scanning (pre-scanning) the original image in rough, and then scanning (main scanning) it in detail. The original image is displayed in accordance with data of the pre-scanning and the data of the pre-scanning is stored in a memory. On the basis of the stored data, the condition parameters for the image processing are determined automatically (or manually) and the image output is carried out at a high speed and high efficiency by judging the relationship which is provided by the condition parameters, between the original and the photosensitive material so as to make remarkable improvements in producing the printing plates.

10 Claims, 17 Drawing Sheets

AUXILIARY SCANNING

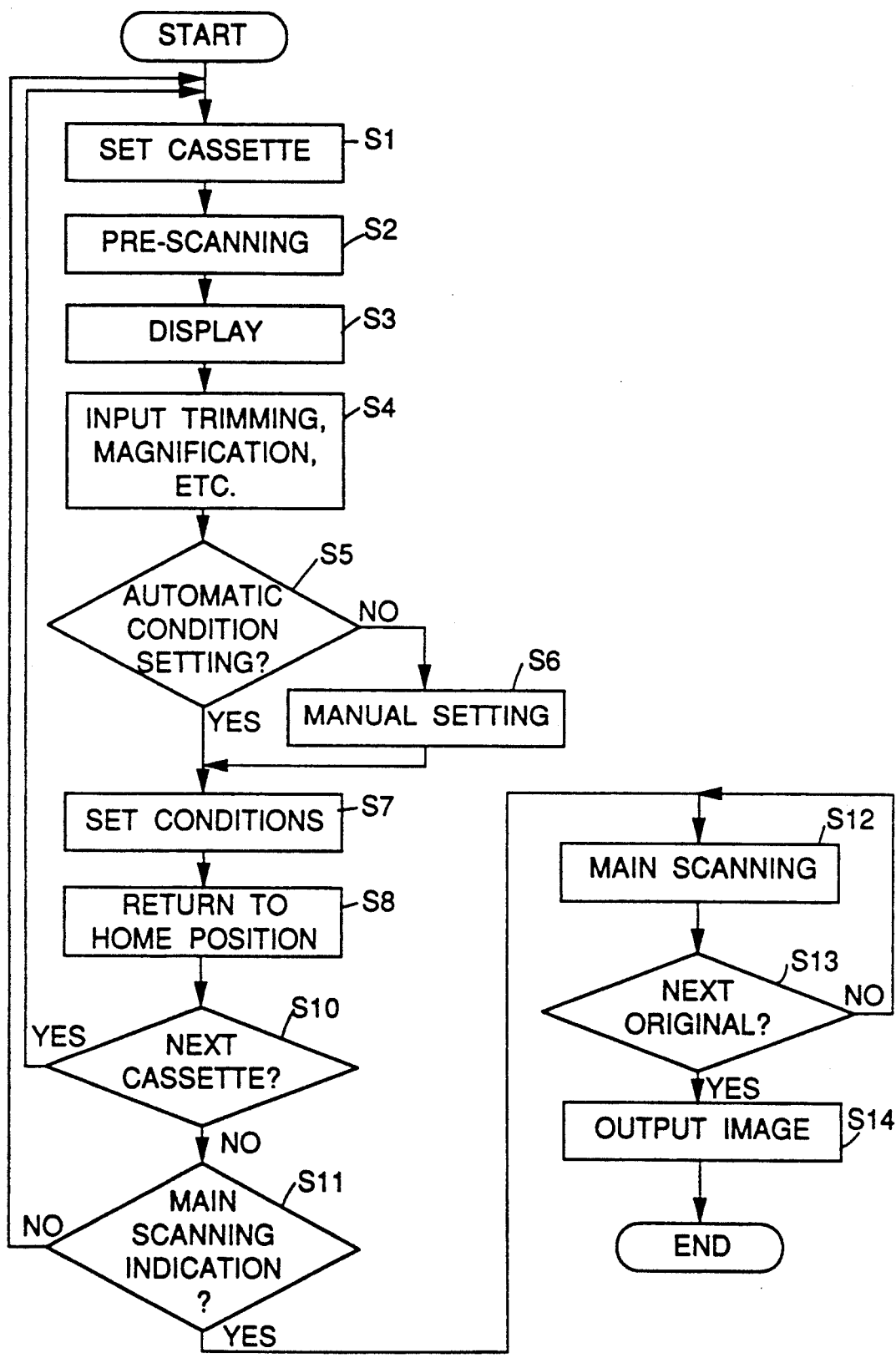
F I G. 15

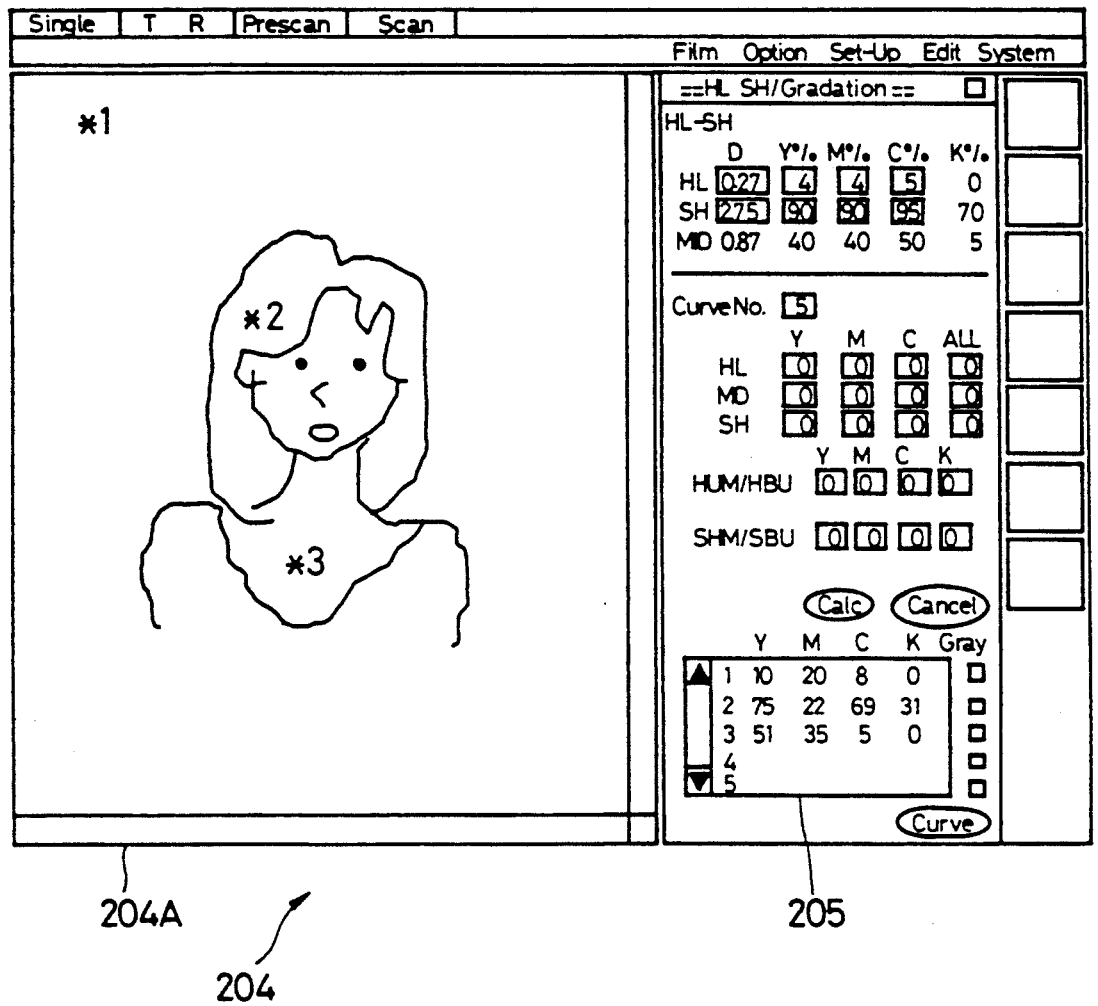
F I G. 16

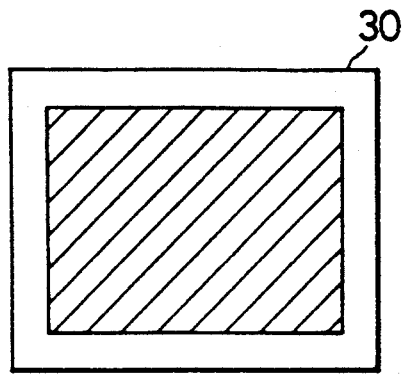
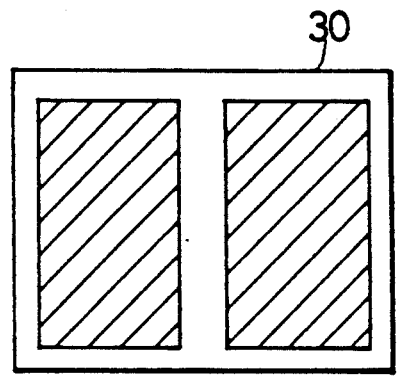
FIG. 17A    FIG. 17B
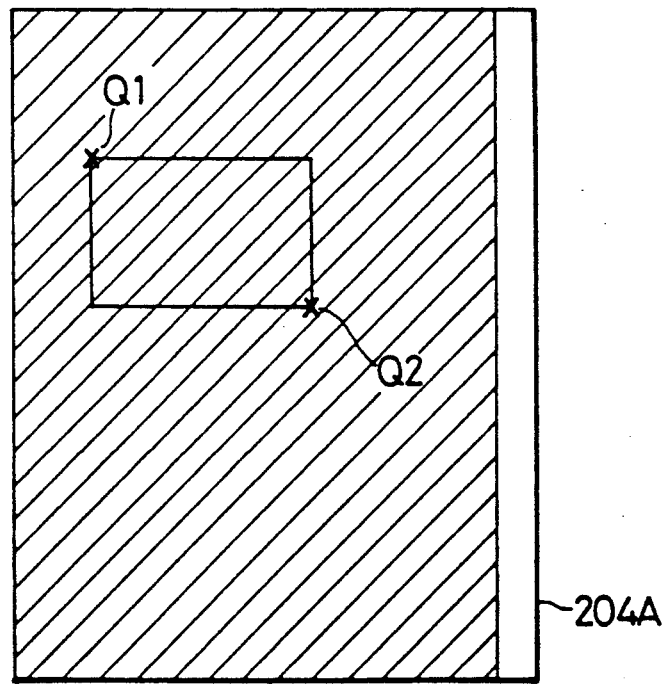
FIG. 18

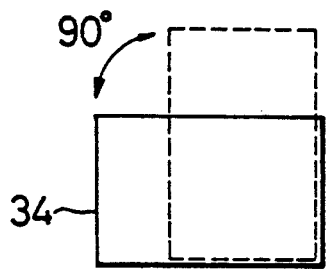
F I G. 20
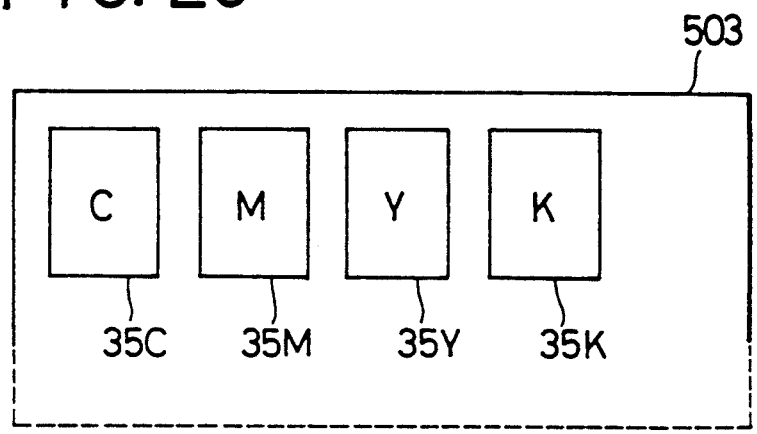
F I G. 21A
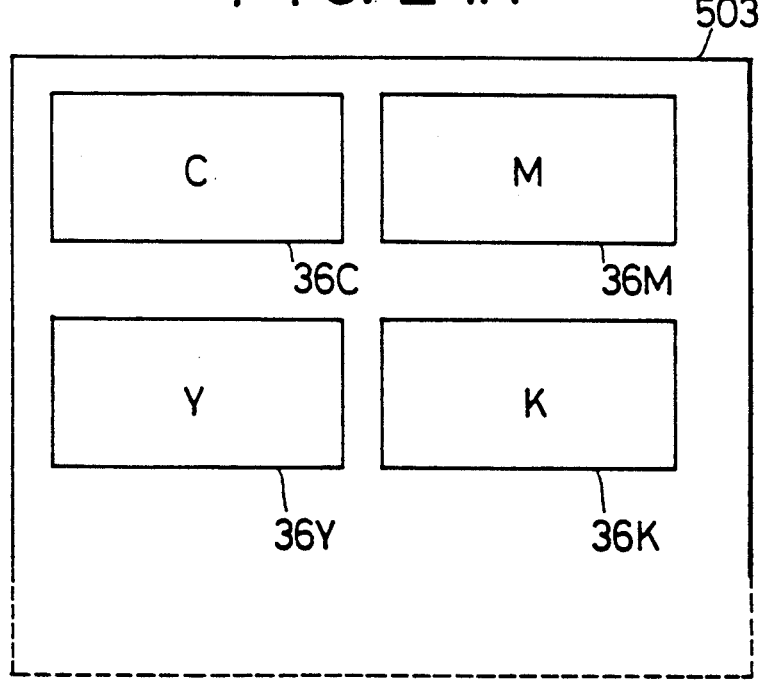
F I G. 21B

SYSTEM FOR PRODUCING A HALFTONE FILM OR A PRINTING PLATE

BACKGROUND OF THE INVENTION

1. Field of the Invention

The present invention relates to a color scanner of a plane scanning (flat bed) type of a high speed and a high efficiency, and more particularly to the color scanner comprising the steps of reading a color image to obtain and store the image data by pre-scanning for rough scanning, setting condition parameters to read and process the original by main scanning for detailed scanning, and recording effectively the image of the color original on a photosensitive material to produce printing plates.

2. Description of the Prior Art

According to one of the conventional methods for manufacturing each color separation plate of a plurality of original color images, each original image is halftoned by a predetermined number of times by means of a color scanner so as to produce a color separation film, a mask plate produced in a different process and the halftoned color separation film are laid-out on adhered to a layout sheet, and the layout sheet is exposed to light. However, the conventional method for manufacturing color separation plates has disadvantages, such as many processing steps, a necessity of skilled craftmen for precisely positioning and adhering the color separation film at the predetermined places of the layout sheet, much time, much laborous and skillful work, and much material.

There is another conventional method for reproducing the color image, in which method a plurality of original images respectively are printed in color by the predetermined number of times, the reproduced original images are cut out in the predetermined shape of an image on a predetermined block copy, the cut out image are laid-out and adhered on the predetermined positions of the block copy board. However, because the conventional method uses a photographic technique, it is not possible to freely change a color correction processing, a sharpness emphasis, and gradation conversion. The result being poor image quality. In addition, there has been an apparatus output-layouting simultaneously square images through a plurality of input apparatus (refer to, for example, Japanese Patent Publication No. 31762/1977). The conventional apparatus for outputting a square image has numerous disadvantages, namely, it is difficult to correspond to all or any shapes of the image, it requires laborious work for producing the mask plate, and it requires a plurality of input scanning section to be used to input the color original.

Recently, a layout retouch system (which is so called as a total system for plate making process of the printing industry) has been proposed, in which system the images are input through a digitizer in order to display images and patterns on a color CRT. The color original image is color-scanned with a designated magnification and the scanned image is stored in a memory device after A/D-converting. Then, the stored color original image information is displayed on the color CRT according to the input image information, the displaying image is edited in a main memory device of a computer through an interactive input system and then the resultant is again stored in a magnetic disc or the like with a format corresponding to the outputted display. Next, the color image information corresponding to the display or scene edited and outputted is D/A-converted and input to the output control circuit of a color scanner in order to obtain the desired layout image. The layout retouch system above necessitates disadvantageously a memory medium of such capacity for storing the information of the color original image and a high speed computer for editing or processing the information, resulting in increased cost of the whole construction of the system, and a time increase for editing or processing the information.

Another conventional system for inputting and outputting the image, which has been improved to solve the shortcomings mentioned above, is shown in FIG. 1 and described in Japanese Patent Laid-open No. 11062/1984. According to the conventional system shown in FIG. 1, a color original 2 applied on a rotary input drum 1 is output as an image on a recording material, for example, a color paper 11 pasted on an output drum 10, which rotating is according to the image information input through a digitizer 14 of an image input apparatus. In the image input/output system above, the color original 2 is color-scanned by a reading head 21 in order to separate in color and the color separation signal CS obtained is input to a logarithmic converting circuit 3. The color separation signal CS is converted to density signals DN through the logarithmic converting circuit 3 and then it is converted to digital density signal DS by an A/D converter 4. The digital density signal DS is input to a signal processing section 5 and a microprocessor 12. In the signal processing section 5, a color correction processing a sharpness emphasis and a gradation conversion are carried out, the color-processed image information DSA is converted to analog signals through a D/A converter 6 and input to a modulator 8 installed in a laser beam printer in order to modulate a laser beam emitted from a laser oscillator 7 and exposes the color paper 11 pasted on the output drum 10 by means of an output head (not shown).

While, it is necessary to install in the system a console 16 provided with a keyboard through which data and commands are input. According to the conventional system, the data and commands or instructions input through the console 16 are input to the computer 13 for processing these data, and commands outputting information and the information is displayed on an interactive graphic display 15. The computer 13 is connected to the microprocessor 12 of a lower-level system, the microprocessor 12 receives the density signal DS output from the A/D converter 4, and is further connected to the signal processing section 5 in order to function the process. The computer 13 and the microprocessor 12 constructs a computer system and the system displays the instruction for the operator and the like on the graphic display 15 according to the stored programs. The positions of the input drum 1 and the output drum 10 are respectively detected by detectors (not shown) and the positional information is input into a motion control section 9. The microprocessor 12 is adapted to be connected to the motion control section 9 so as to relatively drive and control the positional relationship of the input drum 1 and the output drum 10. The digitizer 14 has an original coordinate and X-Y axes of its own. The origin coordinate can be easily to any points, and X-Y axes can easily rotate by processing the signal. The corresponding relationship between the image position on the input drum 1 and the digitizer 14 is determined by installing guides, such as pins at the common plural position. The digitizer 14 is connected to the computer 13 to which the shape of the images and the desired positional coordinates are input.

In the image input/output system shown in FIG. 1, it is noted that the color original 2 is pasted, when it is read, directly to the smooth outer face of the cylindrical input drum 1 as shown in FIG. 2, which drum being made of acrylic resins, glass or the like. The input drum 1 has a light source 20 therein and the light source illuminates the color original 2 and the light beam LT passes through the cylindrical wall of the input drum 1. The reading head 21 situated outside of the input drum 1 receives the passed light beam LT, so that the image of the color original 2 is input to the reading head 21. In the condition, it there is a space or gap to a length of about a wavelength of the beam of the light source 20 between the color original 2 and the input drum 1, a Newton ring (interference fringe) is formed by an interference phenomenon happened on the surface between the rear face of the color original 2 and the front face of the input drum 1, so that the Newton ring is appeared on the color original 2 in the shape of stripes or density irregularity, thus deteriorating the quality of the original considerably.

According to the conventional method, in order to prevent the interference stripes from forming, super particle powder has been scattered or applied between the color original 2 and input drum 1, or filling agent is coated on the cylindrical input drum 1. However, the fine particle powder has disadvantages, such as the outlines of particles are clearly seen when the multiplication of the image is high and the powder is troublesome to handle. The filling agent also has shortcomings, such as the application or coating and removing or wiping-out of the filling agent is very difficult to completely do.

It is known that the image input/output system of the prior art receives an image information on the original film and the like, functions to enlarge/reduce the image, and outputs the image with any layout on the display or some output devices. The image/output system must know or determine the coordinates of the color original 2 on the input drum 1 in order to layout the image during the reading of the original as shown in FIG. 2. Consequently, as shown in FIG. 3, the color original 2 is pasted on the original pasting base 22 of transparent and square-shaped sheet having a thickness of about 100 μm by pasting tapes 23. Positioning holes 24 formed in the original pasting base 22 are fitted onto the corresponding pins of the digitizer 14 so as to input the coordinates of the particular or necessary portion of the color original 2 to the image input/output system. Then, the positioning holes 24 of the original pasting base 22 are fitted securely onto the corresponding pins 25 planted on the input drum 1 as shown in FIG. 4. As next step, the light source 20 in the interior of the input drum 1 as shown in FIG. 2, irradiates the color original 2 and the reading head 21 receives the passed light beam LT through the drum wall and the color original 2, so that the image of the color original 2 is input to the reading head 21. The input image is compared to the coordinates input by the digitizer 14 so as to layout the image.

Furthermore, the conventional color scanner necessitates expert operators determining and setting the separating conditions and signal processing conditions and the time used to the condition determination is considerably longer than that of the system for which time the system actually processes the separating operation and the signal processing. Then, operation of the conventional color scanner is complicated, so that psychological burden upon the operator is very heavy.

A color separation scanner, which processes the color original by the plane scanning method with the application of the TV camera, has appeared so as to solve the defects of drum type color scanner above mentioned, however, for operating this kind of apparatus practically the system has problems in increasing the speed and efficiency of data reading process, and the operation for setting the parameters of this type of color scanner is still complicated.

SUMMARY OF THE INVENTION

The present invention has been accomplished under the situation mentioned above. The object of the present invention is, therefore to provide a color scanner of a plane scanning (flat bed) type where the image processing condition can be determined automatically by means of analysis of the original data, operating a pre-scanning (rough scanning) which data is stored and displayed and a main scanning (detailed scanning) sequentially, further where a manipulated slit is installed and the output image is displayed skillfully so as to produce printing mask plates without troublesome pasting of the original and troublesome operation and with an increase in the productivity.

According to one aspect of the present invention, for achieving the objects described above, there is provided a color scanner of a plane scanning (flat bed) type, where an original received on the original cassette is read optically by the plane scanning and where the read data after being suitably processed is exposed and output on a photosensitive material to produce a halftoned film or a printing plate, which comprises the steps of: operating the pre-scanning for rough scanning and the main scanning for detailed scanning to store the data obtained by the pre-scanning and to output the original image on the display portion according to an instruction, automatically or manually setting the condition parameters for the data processing by using the stored data, processing the data read by the main scanning in the order of said condition parameters determined, and outputting the image at a high speed and efficiently by judging the relationship between the original and the photosensitive material to produce the halftoned film or the printing plate.

The nature, principle and utility of the invention will become more apparent from the following detailed description when read in conjunction with the accompanying drawings.

BRIEF DESCRIPTION OF THE DRAWINGS

In the accompanying drawings:

FIG. 15 is a flow chart to show an example of the operation of the present invention;

FIG. 16 is an example of an image display;

FIG. 17A and 17B show examples of the application of the color originals to the original cassette, respectively;

FIG. 18 is a view to explain the image display;

FIG. 20 and FIGS. 21A and 21B are views to explain the image recording of the present invention, respectively.

DESCRIPTION OF THE PREFERRED EMBODIMENTS

Figure 1:
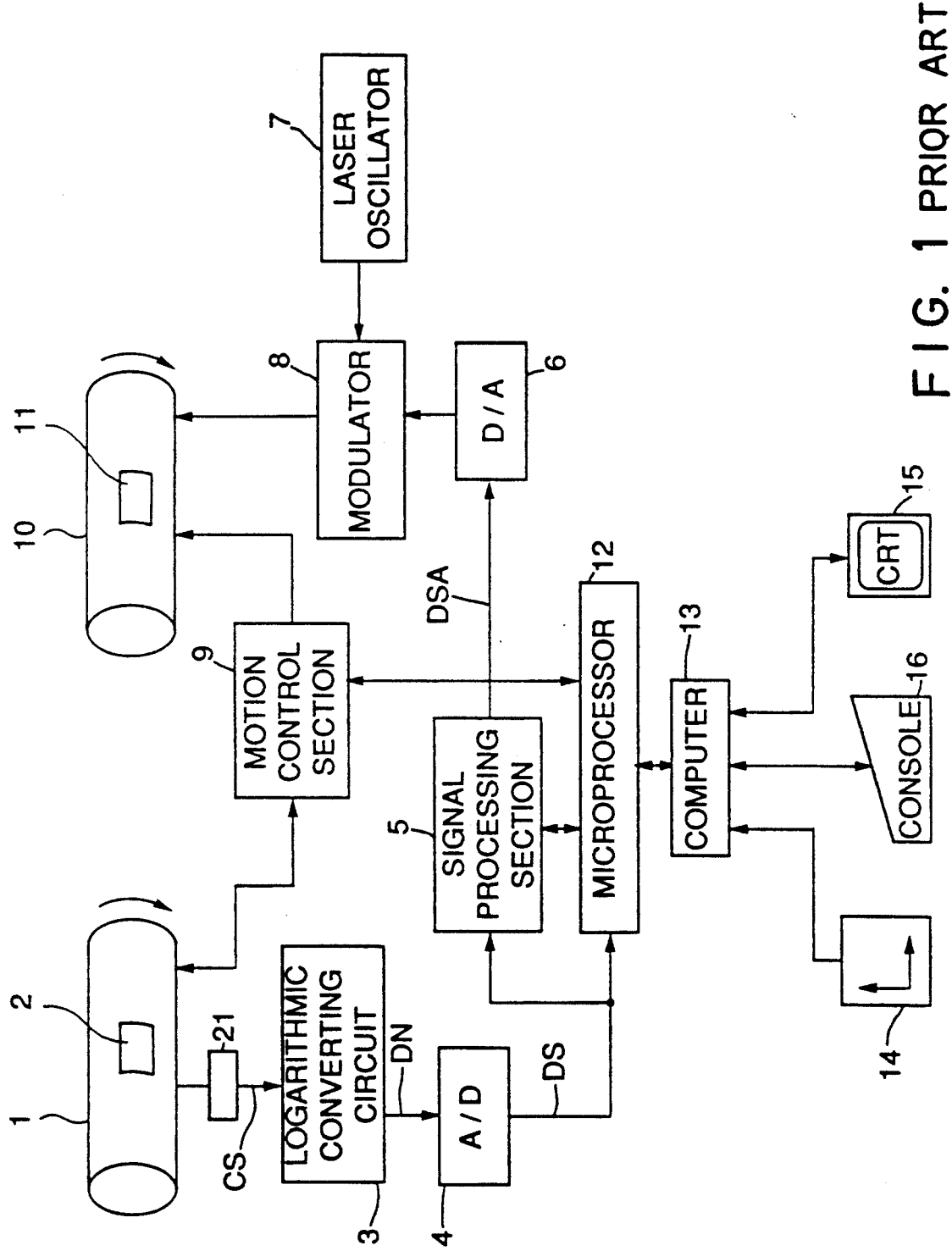
FIG. 1 is a block diagram showing an example of a conventional image input/output system.
Figure 2:
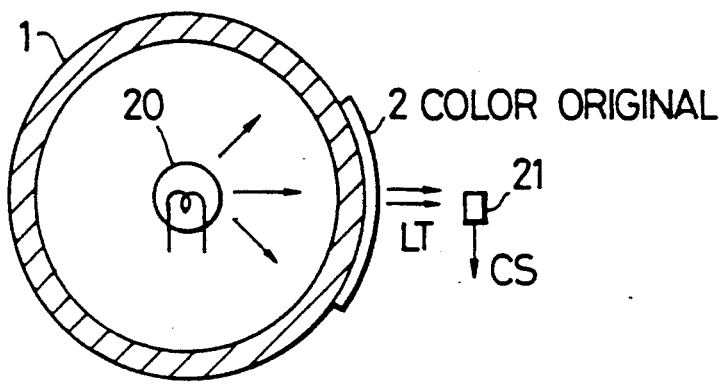
FIG. 2 to FIG. 4 are views to explain the method of adhering the color original on the input drum.
Figure 3:
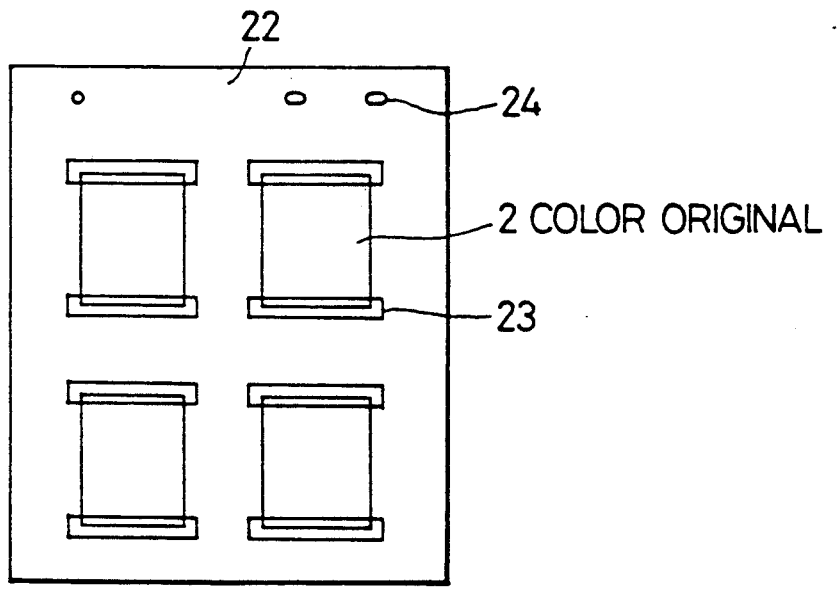
Figure 4:
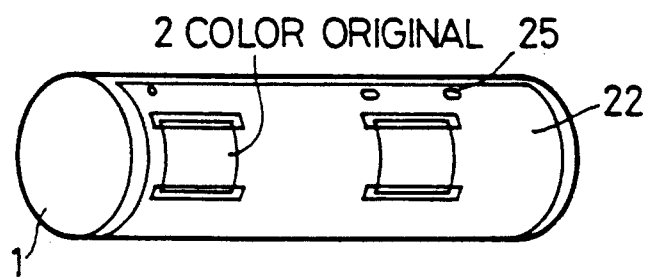
Figure 5:
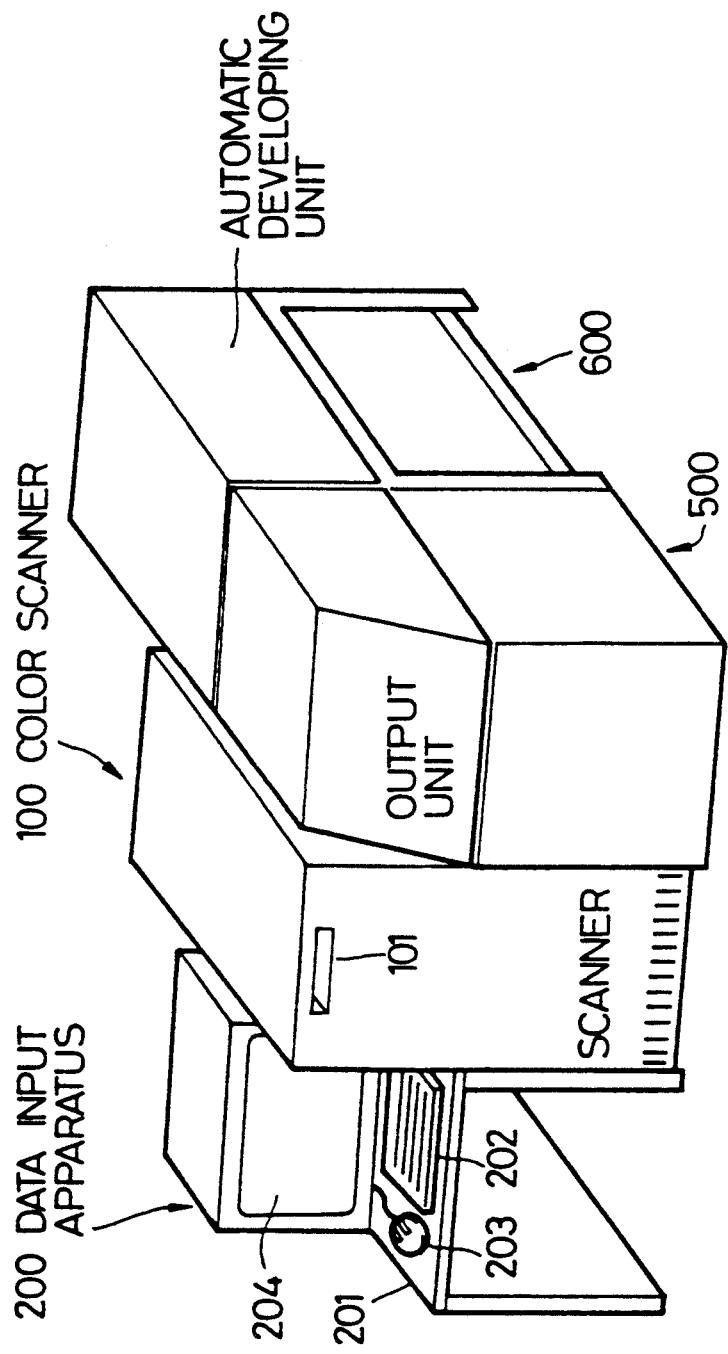
FIG. 5 is a view of one of the embodiments of a color scanner according to the present invention.

FIG. 4 shows the external appearance of a color scanner according to the present invention. The system has a scanner 100 for reading an original image placed at the center of the structure. At upper port of the scanner 100, the cassette inserting window 101 is located to be charged with an original cassette holding a color original. On a desk 201 adjacent to the scanner 100, there are a keyboard 202 and a mouse 203 as the data input apparatus 200 through which an operator inputs necessary data, instructions or the like. A CRT 204 for displaying the necessary information and the original image by means of the divided image frame is installed at the top of the desk 201. The output unit 500 situated side by side with the scanner 100, outputs halftoned film on the basis of the data processed by the signal processing section 400, which will be explained hereinafter, installed in the scanner 100. The automatic developing unit 600 for developing the separation making film output from the output unit 500 is provided behind the output unit 500. It is understood that the shape and arrangement of respective units above are not limited to these shown in FIG. 5.

Figures 6, 7:
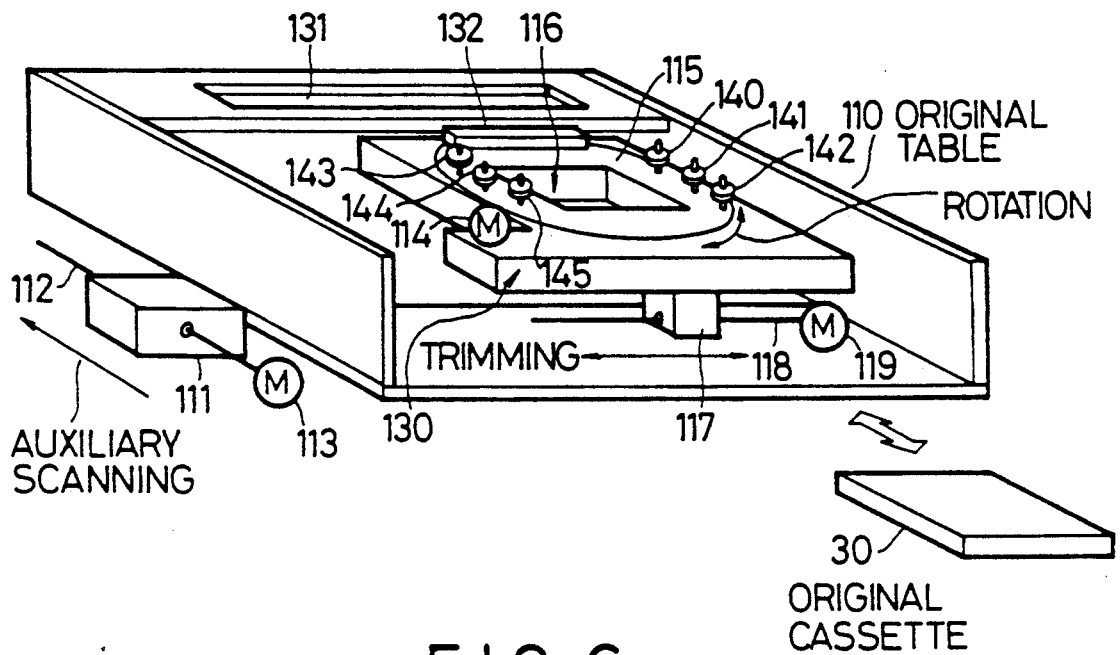
FIG. 6 is a constructive view of an example of an original table of the present invention.
FIG. 7 is a constructive view of a loading mechanism of an original cassette.

FIG. 6 shows the construction of the original table 110 of the scanner 100. The original table 110 is box-like and is adapted to be scanned along the auxiliary scanning direction by means of a moving member 111 connected to the construction of the original table 110, a wire 112 connected to the moving member 111, and a motor 113. There is a rotary base receiver 115 driven along the arrow shown by a motor 114 in the interior of the original table 110 and there is a cassette receiver 116 to which the original cassette 30 is applied at the center of the rotary base receiver 115. The rotary base receiver 115 is adapted wholly to carry out a scanning operation along the trimming direction shown by a moving member 117 connected to the structure of the rotary base receiver 130 and a wire 118 joined to a moving member 117 and a motor 119. It is possible to carry out scanning operations of the moving members 111 and 117 by means of another mechanism, such as a screw bar and nuts. A transparent correction region 131 for adjusting the shading and the like by detecting the basic quantity of light at the start of the image reading is situated on the surface of the original table 110 at the end of the auxiliary scanning operation. The correction region 131 includes the home position of the auxiliary scanning direction and may be detected by the image sensor just when the scanning operation starts. On the above surface of the rotary base receiver 115, a pair of array of the free guide rollers 140 to 142 and 143 to 145 which press the original cassette from both sides to convey are fixed respectively in a row, and there is a stopper 132 at the end on the rotary base receiver 115 for positioning the original cassette 30. Further, the marker (not shown) which informs the ID number and the size of the original received on the cassette is affixed anywhere suitable on the original cassette 30 in order to be detected by the detector from when the original cassette 30 is inserted until it is charged in the cassette receiver 116.

FIG. 7 schematically shows an internal structure of an input section 150 in the color scanner 100. The arrangement is such that the original cassette 30 is transported along the feed passage 151 through the cassette inserting window 101 of the input section 150. Feed rollers 152 to 154 are operatively arranged at both sides of the feed passage 151. These feed rollers 152 to 154 are respectively connected to drive rollers 155 to 157 through drive shafts. A belt 162 is wound around these drive rollers 155 to 157 and a drive shaft 161 of a motor 160, so that the feed rollers 155 to 157 are rotated by the motor 160 so as to guide and feed the original cassette 30 along the feed passage 151. The thus fed original cassette 30 is moved into the original table 110 which is described in detail with reference to FIG. 6.

Figure 8:
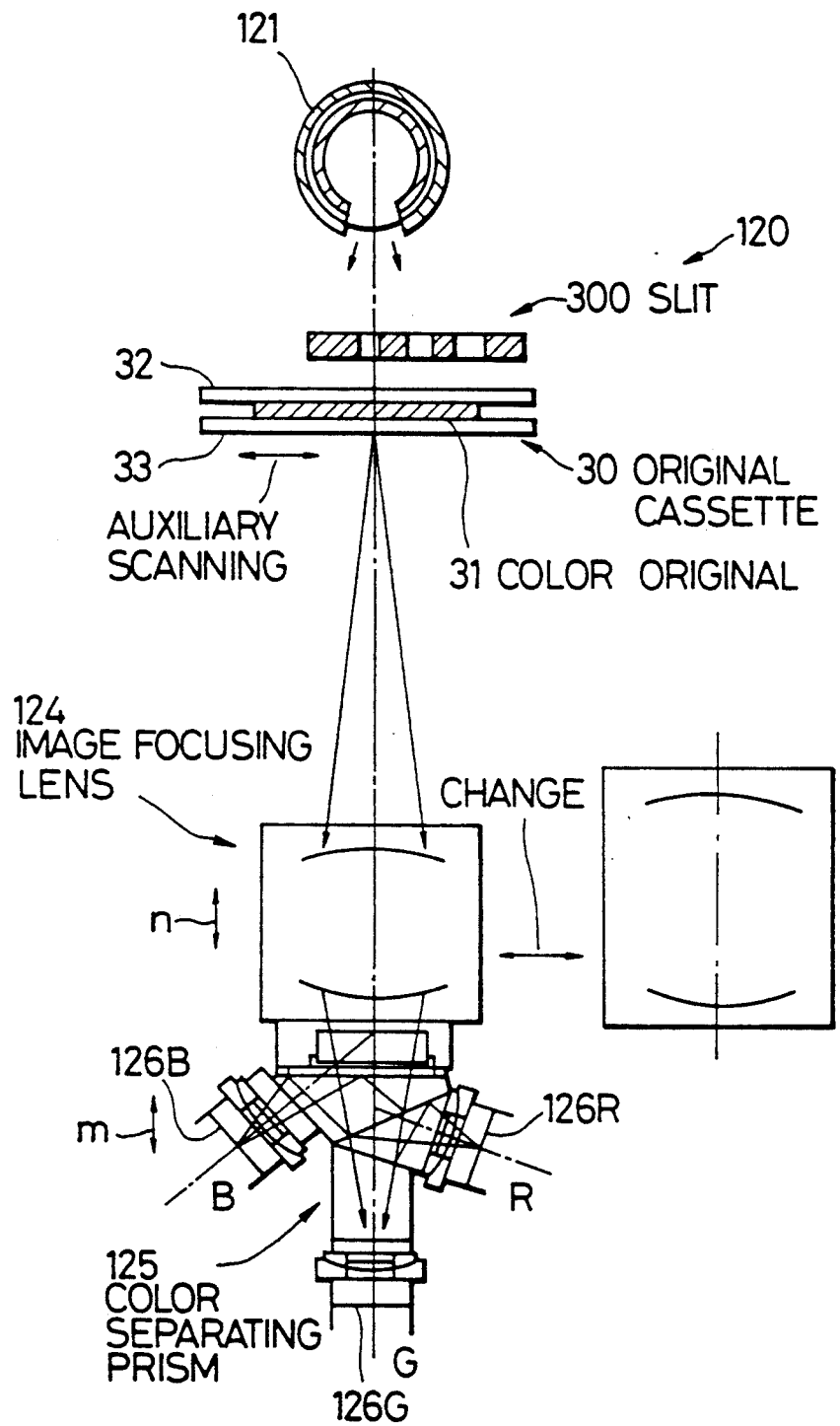
FIG. 8 is an optical system of a image input section.
Figure 9:
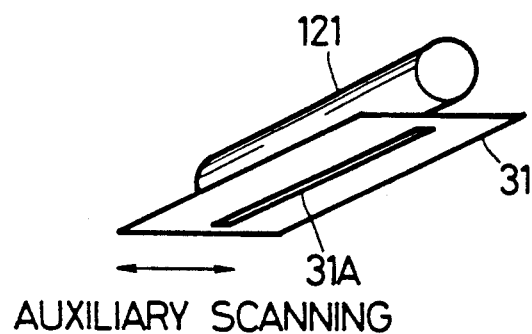
FIG. 9 is a view showing a linear scanning by means of the relation between the light source and the original.

FIG. 8 depicts an optical system of the input portion 120 of the scanner 100. The original cassette 30 received in the cassette receiver 116 is illuminated by a linear-shaped aperture type fluorescent lamp 121 arranged at an upper position through a slit 300 for removing flare which will be explained hereinafter. In the original cassette 30, a color original 31, for example, a color reversal film and the like (35 mm, Brounie, 4"×5") is fitted or stored and the color original 31 is sandwiched by a pair of anti-reflection type transparent glasses 32 and 33 for holding the color original. The image light passed through the slit 300 and the original cassette 30 is input to an image focusing lens 124 of a predetermined magnification and also input to a color separation prism 125 connected to a lower portion of the image focusing lens 124, separating into the three primary colors of red (R), green (G) and blue (B). The lights of these separated three primary colors RGB are input to image sensor 126 (126R, 126G and 126B), respectively comprising a CCD (Charge Coupled Device) and the like and then converted to image signals PS of R, G and B. A plurality of image focusing lenses 124 of different magnification appointed are prepared on a turret mechanism and any lens can be used easily. FIG. 9 shows a linear-scanning relation between the fluorescent lamp 121 and the color original 31. The whole image is read when the linear shape main scanning line 31A moves along the auxiliary scanning direction.

Figure 10:
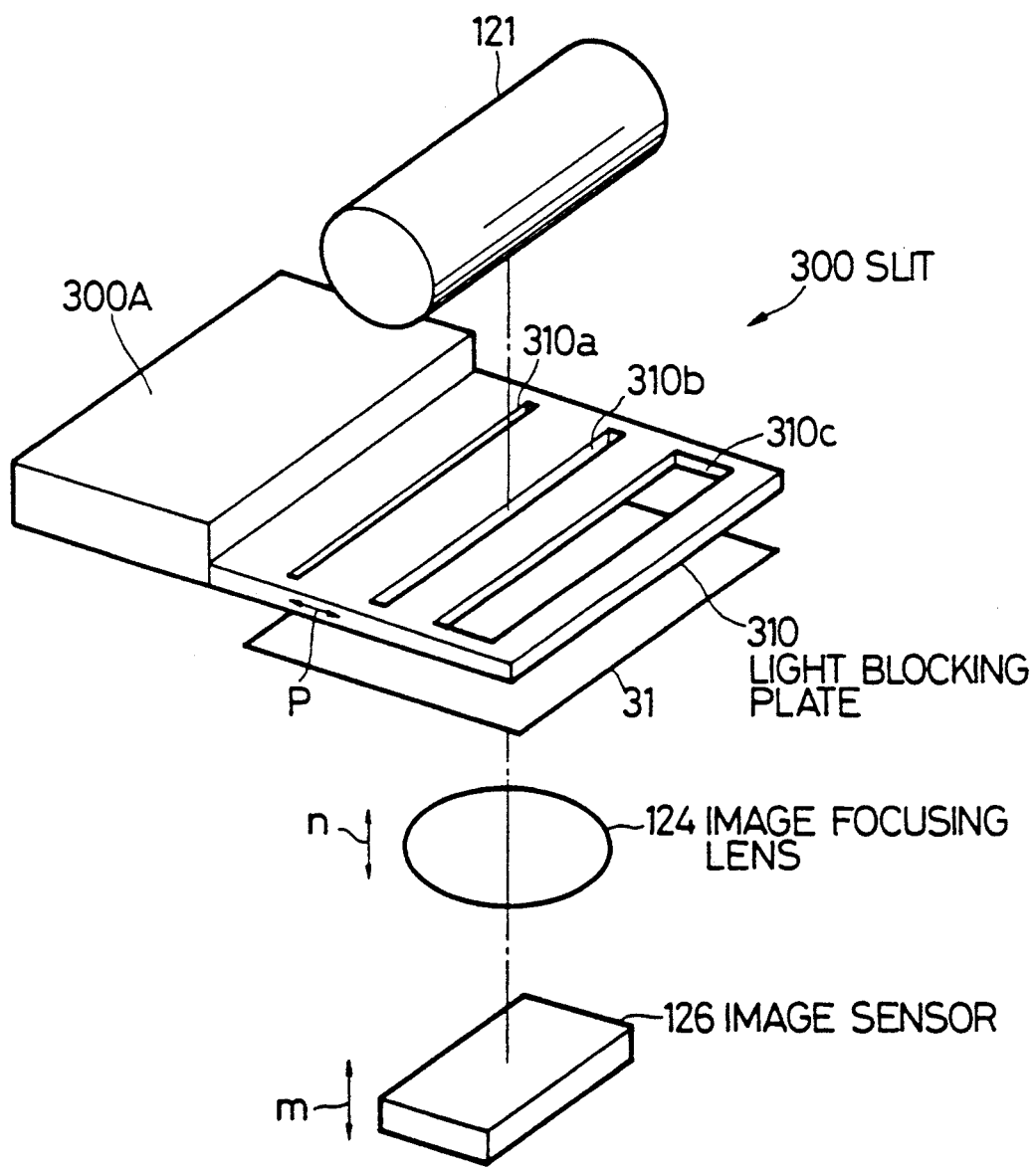
FIG. 10 is a principle constructive view of a slit mechanism according to the present invention.

In the present invention, a width variable slit 300 for omitting the flare in the optical system is installed between the fluorescent lamp 121 and the original 31 (the original cassette 30), and the slot 300 is controlled at every scanning to adjust itself to the least width within the range of the predetermined quantity of light. FIG. 10 shows an example of the position adjusting the mechanism of the slit 300 in the oblique projection drawing. Light blocking plate 310 having different width of slits 310a, 310b and 310c which may move in the direction of arrow P shown in the figure by means of the slot position adjusting mechanism 300A, is located in the predetermined place between the fluorescent lamp 121 and the color original 31. On the surface of the light blocking plate 310, the flat black paint material (for example, a trade name: Sunday Paint (Dai-Nippon Toryo Co., Ltd. In Japan) is painted or printed. In this mechanism shown in the figure, when the optical magnification of image is varied by moving the image sensor 126 and the image focusing lens 124 respectively in direction of arrows m and n shown in the figure, the slit having the suitable slit width is positioned on the light axis by moving the light blocking plate 310 along the direction of arrow P by means of the slit position adjusting mechanism 300A, inorder to obtain a clear image.

Figure 11:
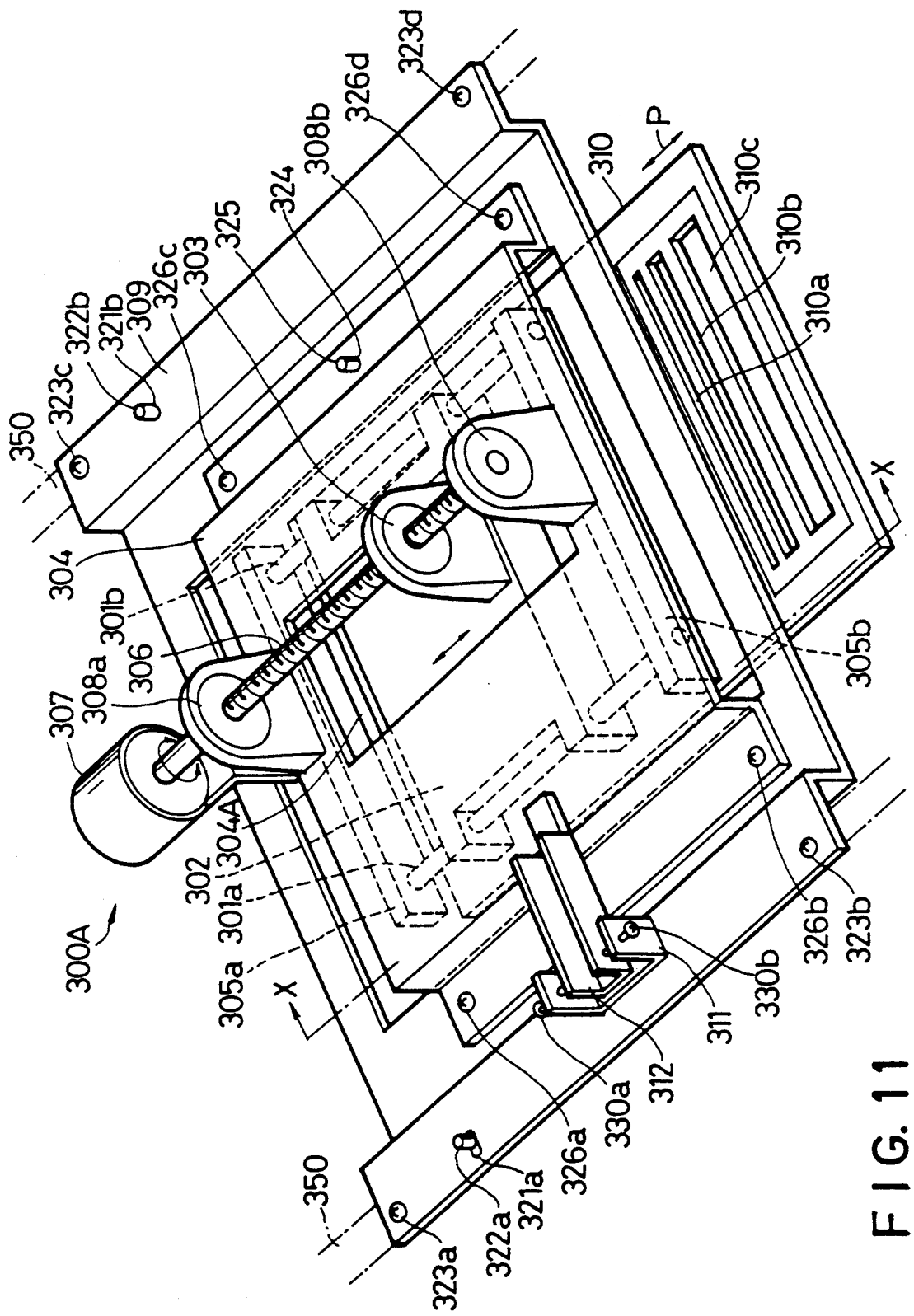
FIG. 11 is a constructive view to show a drive mechanism of the slit.
Figure 12:
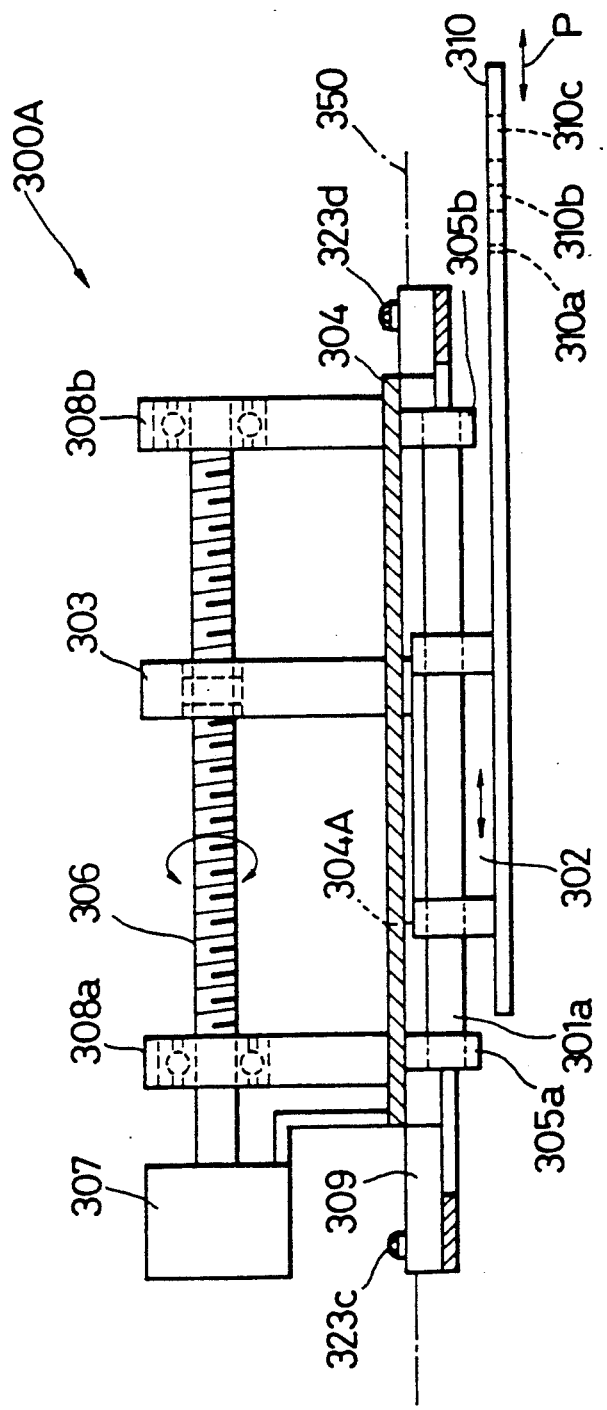
FIG. 12 is a constructive view showing the X—X cross section of FIG. 11.

The schematic oblique projection drawing in FIG. 11 shows an example of the slit position adjusting mechanism 300A and FIG. 12 depicts the X—X cross section drawing of FIG. 11. A movable slider 302 being guided smoothly and steadily along the guide bar 301a and 301b arranged in parallel to the direction P in which direction the light blocking plate 310 moves, is fixed on the light blocking plate 310. This slider 302 fixed on its surface a nut 303 screwed to a screw bolt bar which is also arranged in parallel to the moving direction P of the light blocking plate 310. A base plate 304 having an opening 304A from which the nut 303 of the ball screw fixed on the slider 302 thrusts out is fixed keeping the predetermined gap or space between the fixed surface of the slider 302 and the surface of the base board 304 opposite to the slider 302 so as not to contact each other. On one side of the base plate 304 (the side facing the slider 302) is operatively secured support member 305a and 305b which support fixedly guide bars 301a and 301b respectively at both ends, and on the other side of the base plate 304 is secured a pulse motor 307 for rotating an external thread 306 into which the ball screw nut 303 is screwed and bearings 308a and 308b holding the external thread 306. Only the base plate 304 is secured on a base plate 309 fixed on a machine base 350, other members such as the light blocking plate 310, the slide 302 and the like is kept away from the base plate 309. In addition, an inclination adjustment means 311 which has a U-shaped cross section has a pair of screws 330a and 330b screwed on each up-right side respectively, is fixed on the base plate 309. An inclination adjustment lever 312 is held between the screws 330a and 330b and its end is fixed on the base plate 304 at the other end, keeping space with the inclination adjustment means 311.

For attaining the slit position adjusting in these structures described above, the following procedure is carried out. The base plate 309 is fixed on the machine base 350 by the screw 323a, 323b, 323c and 323d after being positioned in such a manner that positioning pins 322a and 322b on the machine base 350 is fit into corresponding positioning holes drilled on the base plate 309. Then, the base plate 304 with the light blocking plate 310 and the like is temporarily positioned in such a manner that n inclination adjustment pin 325 fixed on the base plate 309 is fit into a corresponding hole 324 drilled on the base plate 304. A desired slit is positioned on the optical axis by moving the light blocking plate 310 through the driving of the pulse motor 307. When the line-shaped image light passed through the slit 300 inclines against the image sensor 126, the inclination adjustment lever 312, the base plate 304 and the light blocking plate 310 is rotated at the center of the inclination adjustment pin 325 by loosing one of the screws 330a and 330b attached to the inclination adjustment means and tighten the other, so that the inclination of the line-shaped image light can be eliminated. To secure the base plate 304 correctly positioned on the base plate 309 in the above way by means of fixing screws 326a, 326b, 326d allows the line-shaped image light through the slit 300 entered into a proper position of the image sensor 126.

Figure 13:
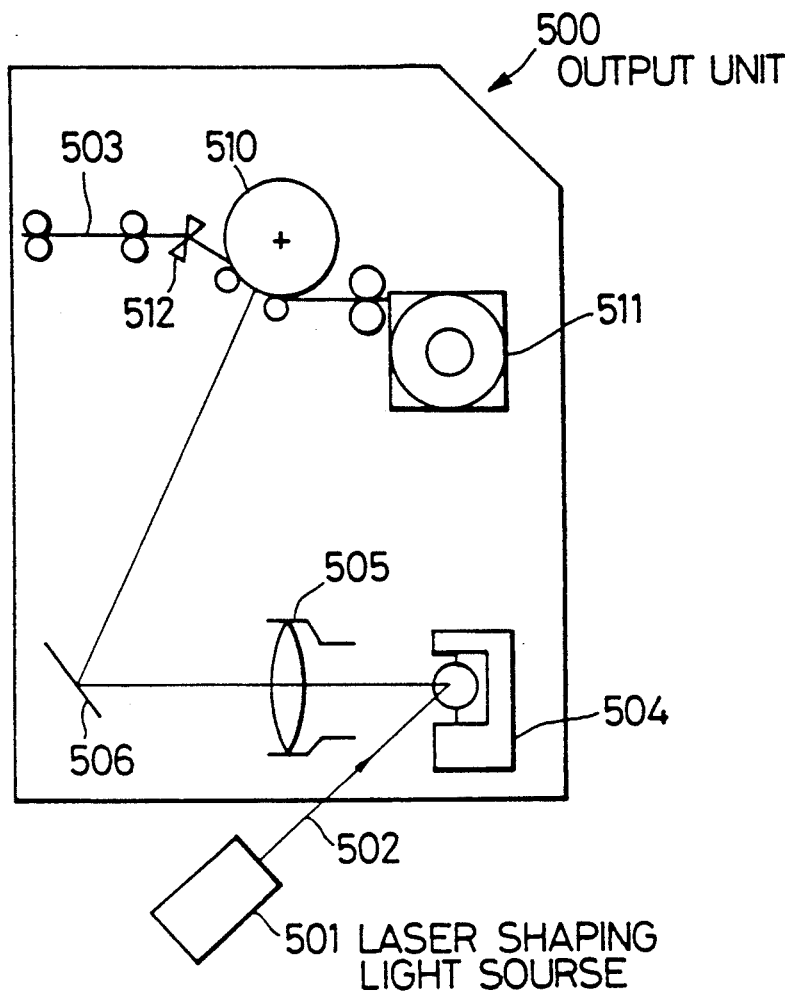
FIG. 13 is a constructional view of one of the embodiments of an output unit.

FIG. 13 shows roughly the construction of the output unit 500, which functions as a slave of the signal processing section 400, carrying out a fixed control sequence on the command transferred by an interface RS-232C and returning the resultant condition to a host machine CPU 401 of the signal processing section 400. That is, when a status check signal is sent from the CPU 401 to the output unit 500, the output unit 500 outputs a "READY" signal when it is exposable condition and returns a "OK" signal responsing to exposure preparation inquiry signals sent from the CPU 401 in order to carry out the exposure. The image signal sent from the signal processing section 400 is halftoned in a halftoning circuit 531 which will be described hereinafter so at to be converted to ON/OFF signals. Thus, the ON/OFF signals are exposed on a photosensitive material 503 by a laser beam 502 emitted from a laser shaping light source 501 comprising laser diodes. The main scanning of the laser beam 502 is done by using a resonant scanner 504 and the mainly scanned laser beam exposes the photosensitive material 503 rounded around the auxiliary scanning drum 510 through an fθ lens 505 and a mirror 506. The auxiliary scanning drum 510 carries out an auxiliary scanning relative to the laser beam 502 and the auxiliary scanning drum 510 is driven by a DC servo-motor controlled by PLL (Phase Locked Loop). The photosensitive material 503 is stored in a photosensitive magazine 511 and conveyed around the auxiliary scanning drum 510 through conveying rollers. Then, the photosensitive material 503 is cut by a cutter 512 at a predetermined length and discharged out of the output unit 500.

The halftone processing of the image carried out by the halftoning circuit 531 is digitally done by sequentially comparing the image signal to a dot (halftone data) of the threshold values of eight bits. The standard halftone data are stored in an ROM and other halftone data are stored in an optional floppy disc. As required, the halftone data is loaded in the system from the optional floppy disc. The output unit 500 is always a slave of the signal processing section 400, only processes the commands sent from the RS-232C at fixed sequence and returns the resultant condition to the signal processing section 400. The output unit 500 can not activate communication by itself.

Because of such construction of the output unit 500, a series of sequential processings during an exposing are carried out when the signal processing section 400 controls the output circuit 500 through a communication. The output unit 500 further has functions which are initialized through a panel of the signal processing section 400, such as initial loading, cleaning, cutting and a set of the remaining photosensitive material register. The initial loading means feeding of the photosensitive material 503 by the predetermined length so as to cut or remove the exposed portion of the photosensitive material. When the photosensitive material magazine 511 is loaded or a material-jamming is happened and the cover is open, attaining the initial condition. The cleaning refers to an operation, in which a predetermined volume of the photosensitive material 503 is drawn out and cut, sent to the automatic developing unit 600 so as to operate the automatic developer supplying developing liquid, a fixing liquid, and washing water. The cutting is an operation in which the photosensitive material 503 drawn for exposing it cut and discharged. In the setting of the remaining photosensitive material register, the remaining volume of the exposure material is set when the photosensitive material magazine 511 is loaded, the set volume is reduced at each cutting and discharging step, and the resultant is displayed.

Figure 14A:
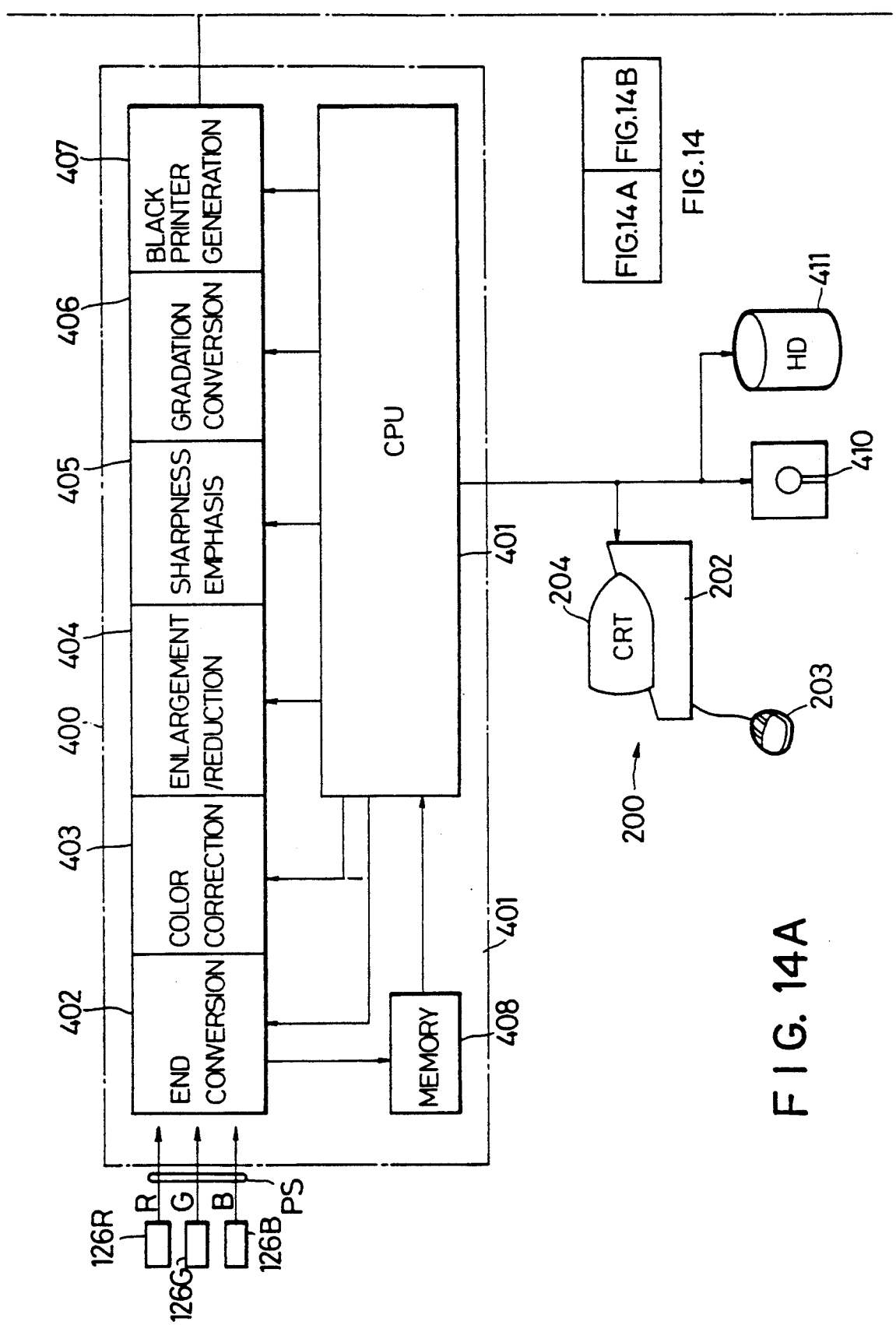
FIGS. 14A and 14B are block diagrams showing the circuit system of the present invention.
Figure 14B:
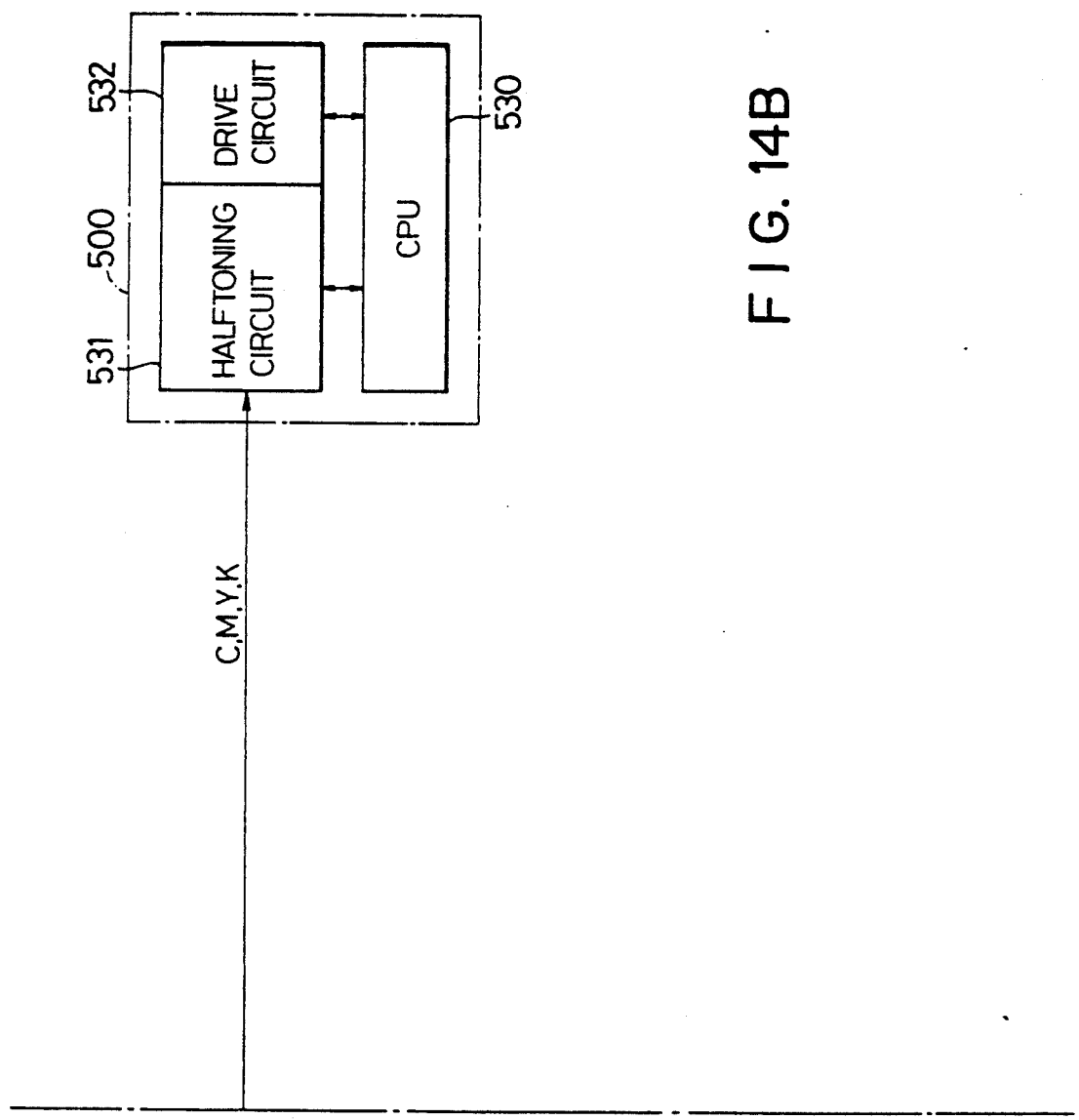

The inner construction of the color scanner is shown in FIGS. 14A and 14B, in the system the RGB image signals PS output from the image sensors 126R, 126G and 126B of the scanner 100 are, after being processed through A/D conversion, input to the signal processing section 400. The signal processing section 400 has a CPU (host computer) 401 for controlling the whole functions of the signal processing section. The CPU 401 controls an END (Equivalent Neutral Density) conversion 402, a color correction 403, an enlargement/reduction 404, a sharpness emphasis 405, a gradation conversion 406 and a black printer generation 407. The signal processing section 400 has as shown in FIG. 14A a floppy disc 410 and a hard disc 411 connected thereto through which the necessary data is read and stored. The pre-scanning data processed through the END conversion 402 is stored in a memory 408, and the data input apparatus 200 is connected to the signal processing section 400 through the CPU 401 so as to send separation making signals of four colors of C (cyan), M (magenta), Y (yellow), K (black) signalized to the output unit 500. Consequently the laser shaping light source 501 emits the laser beam 502 through the halftoning circuit 531 and the drive circuit 532. The halftoning circuit 531 and the drive circuit 532 in the output unit 500 are adapted to be controlled by the CPU 501.

The operation of the construction as described above will be explained with reference to a flow chart shown in FIG. 15. First, the original cassette 30 is set to the scanner 100 by inserting the original cassette 30 into the cassette inserting window 101 (Step S1). That is, the original cassette 30 is automatically drawn into the cassette receiver 16, the load of the original cassette 30 is detected and then is transported to the predetermined position while the size and ID number are identified by reading the marker on the original cassette 30. Second, according to the pre-scanning indication, the pre-scanning (rough scanning) starts from the home position, to which the optical system is initialized, in the correction region 131 (Step S2). In this case, the pre-scanning starts with calculating and setting the correction data such as shading and the like through the signal processing section 400 by reading the correction region 131 on the original table 110, and setting the skipping rate, the scanning speed and the reading region obtained previously. The pre-scanning is always operated without depending on the original size, at a predetermined magnification to which the optical system is initialized when it is in home position. The pre-scanning data obtained by reading the image data with skipping is sent to the signal processing section 400 so as to be END-converted and stored in the memory 408, while the image obtained from the pre-scanning is displayed on the CRT 204 of the data input apparatus 200 as shown in FIG. 16 (Step S3).

Clearly from FIG. 16, in the present invention, the display portion 204A outputs the pre-scanned image in the left part of the full frame and allows the rest space on the right side to be used for the display and the input operation of the image processing conditions. The display of the image is performed with respect to the original carried out through the instruction from the keyboard 202 or muse 203. The image processing operations for a plurality of any points on the displayed image may be done by the simulation so as to display its results on the display section 205. For example as shown in FIG. 16 the simulation results of the selected point *1 is shown in the "1" column on the display section 205, as well as the point *2 in the "2" column and so forth. It is noted that the indices on the display section 205 may be re-written in real-time if the image processing condition is changed. In relation to the size of the original, the original cassette 30 can hold a sheet in case of the 4"×5" size original as FIG. 17A, two sheets in case of the brownie size as shown FIG. 17B, and 6 sheets in case of the 35 mm size. The image of each original is displayed as shown FIG. 18, is electronically enlarged through the signal processing section 400 so as to attain a maximum resolution of the original on the display portion 204A of the CRT 204. In FIG. 18 is a pair of points Q1 and Q2 is indicated, the trimming range is determined and then the image thereof is enlarged and displayed. The original table 110 moves in the direction of the main scanning in order to automatically adjust the magnification for the main scanning in accordance with the training range determined on the image of the pre-scanning. Then, the operator inputs through the data input apparatus 200 for each original to set the trimming range, the magnification necessarily and the others such as the output lines number, negative/positive, rotation angle and the like, if required (Step S4) and the operator selects the set-up mode (automatic or manual) of the condition parameter necessary for the image processing (Step S5). In case automatic mode is selected, the condition parameters are automatically set on the basis of the pre-scanning data stored in the memory 408 (Step S7) and displayed on the right part of display section of the CRT 204. If the manual mode is selected, the operator inputs the condition parameters through the keyboard 310 (Step S6). In manual mode, since the output of the pre-scanning image is simulated according to the image processing conditions set by the operator and the result is shown on the display section 205, the set condition parameters may be carried out with consulting the results of the simulation. It is noted that the original cassette 30 (or original) could be drawn out from the apparatus during the set-up therefor by setting the condition parameters of the basis of the image data stored in the memory 408 obtained by means of the pre-scanning. The condition parameters refer to coefficients of the color correction, sharpness coefficients for the sharpness emphasis, an inclination of the gradation conversion and the like. The automatic setting of the condition parameters by the pre-scanning operation is carried out by the method disclosed in, for example, Japanese Patent Application Laid-open No. 111569/1987 and No. 111570/1987 invented by the identical application of the present invention.

After the pre-process described above, the image reading portion is returned to its home position (Step S8), the operator judges whether or not the next pre-scanning should be carried out for another cassette (Step S10), if not the image previous input of the color original 31 received in the original cassette 30 is scanned according to the instruction of the main scanning (Step S11). In this case, the original cassette 30 rotates by the rotary base receiver 115, moves along the trimming direction by means of the moving member 117 and along the auxiliary scanning direction by means of another moving member 111 in order to mainly scan the region of the line 31A as shown in FIG. 9. When the main scanning is indicated to start by sending the main scanning information to the input portion 120 of the scanner 100, the signal processing section 400 and the output unit 500, the optical system moves to the position of the necessary magnification, the correction data is calculated and set by reading the correction region 131. Then, the main scanning is carried out according to the reading region indicated by the main scanning indication. That is, the light beam irradiated from the fluorescent lamp 121 and passed through the original cassette 30 is input to the image focusing lens 124 and resolved separated into the colors RGB through the color separating prism 125, focusing each beam colors on the respective image sensors, 126R, 126G and 126B. The image signals PS for detected one line of the display is output from the image sensors 126R, 126G, 126B and input to the signal processing section 400, in which each processing of the END conversion 402, the color correction 403, the enlargement/reduction 404, the sharpness emphasis 405, the gradation conversion 406 and the black printer generation 407 is processed at the set predetermined conditions. It is noted that the main scanning data may not be stored in the memory. The color correction is done by the method, for example, described in Japanese Patent Application Laid-open No. 178355/1983 and the sharpness emphasis is carried out by the method described, for example, in the specification of Japanese Patent Application Laid-open No. 43570/1985. It is possible to use the method described in Japanese Patent Application Laid-open No. 11062/1984 in order to do these processes above including the END conversion and gradation conversion.

Figure 19:
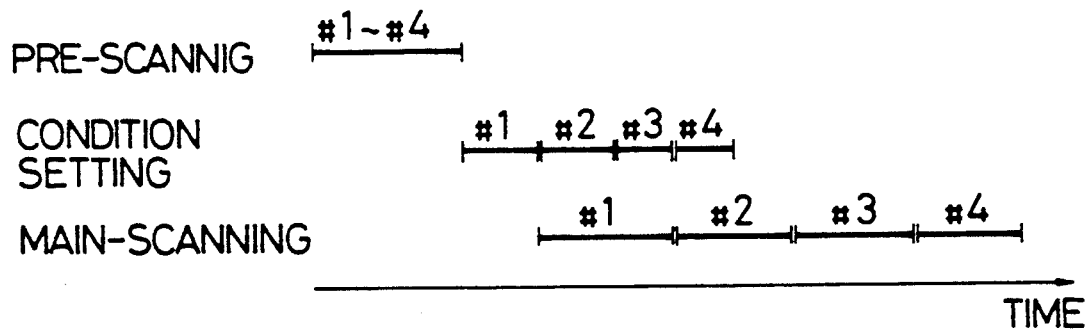
FIG. 19 is a view to show the relation about the pre-scanning, the set-up conditions and the main scanning.

FIG. 19 shows the sequential time relation to the per-scanning, the setting of the condition parameters and the main scanning for the originals #1 to #4. The main scanning for an original which condition parameters have been set and setting the condition parameters for the next original are carried out simultaneously.

The output signal for the mask plates of C, M, Y, K obtained from the main scanning image data through the signal processing section 400 are sent to the output unit 500, halftone-processed by the halftoning circuit 531 of the output unit 500 and sent to the drive circuit 542 of the laser shaping light source 501, and the output signals are emitted in the shape of a binary signal of the halftone output. The laser beam 502 emitted from the laser shaping light source 501 is input to the resonant scanner 504 and the f$\theta$ lens 505, reflected on the mirror 506, and exposed on the photosensitive material 503 rounded around the auxiliary scanning drum 510. The photosensitive material 503 exposed is cut at its predetermined length by the cutter 512, sent to the automatic developing unit 600 and then develops the photosensitive material 503 so as to produce separations of four colors C, M, Y and K. When all operations by the original condition setting and the main scanning are completed, the original cassette 30 is commanded to be discharged and is automatically transferred so as to be discharged from the cassette inserting window 101.

In the present invention, a color image on an original is separated in colors and read to generate image signals. The image signals are effectively processed and exposed on the photosensitive material (output film) 503 in the output unit 500. When printing plates of C, M, Y and K are simultaneously produced, the original table 110 is automatically rotated by 90° and scanned in order to minimize the scanning time for reading the original, considering the output sizes of images C, M, Y and K to be exposed on the photosensitive material 503 and the size (width) thereof. Concretely, an original 34 is placed on a reading portion of the image reading apparatus so as to horizontally lay at its long side as shown in FIG. 20 by solid lines. If the scanning time can be made shorten when the original 34 is vertically laid at its short side as shown in FIG. 20 by dotted lines, considering the output size of the image and the size of the photosensitive material 503, it has better to rotate the original 34 by 90" on the original base. It is of course that when it is possible to shorten the scanning time if the original 34 is placed or laid at its long side, the original 34 is read at a condition as shown in FIG. 20 by the solid lines.

FIG. 21A shows the situation in which respective output originals 35C, 35M, 35Y, 35K of C, M, Y, K are simultaneously exposed on the photosensitive material 503 of the predetermined size in a manner of vertical placing at the short sides of originals. FIG. 21B shows another situation in which respective output originals 36C, 36M, 36Y, 36K of C, M, Y, K are simultaneously exposed on the photosensitive material 503 in a manner of horizontal placing at their long sides. When the original 34 horizontally placed at their long sides as shown in FIG. 20 by the solid lines are read, the output originals respectively are exposed with their conditions as shown in FIG. 21B. While the original 34 vertically placed at their short sides as shown in FIG. 20 by the dotted lines are read, the output originals are exposed with their conditions as shown in FIG. 21A. In order to read the original 34, the original 34 must be simultaneously separated in colors of R, G, B so that all colors (C, M, Y, K) are output in the same direction. In other words, it is impossible to output images on the separated output originals some of which being situated at their short sides and the rest being laid at their long sides on the photosensitive material 503.

Figure 22A:
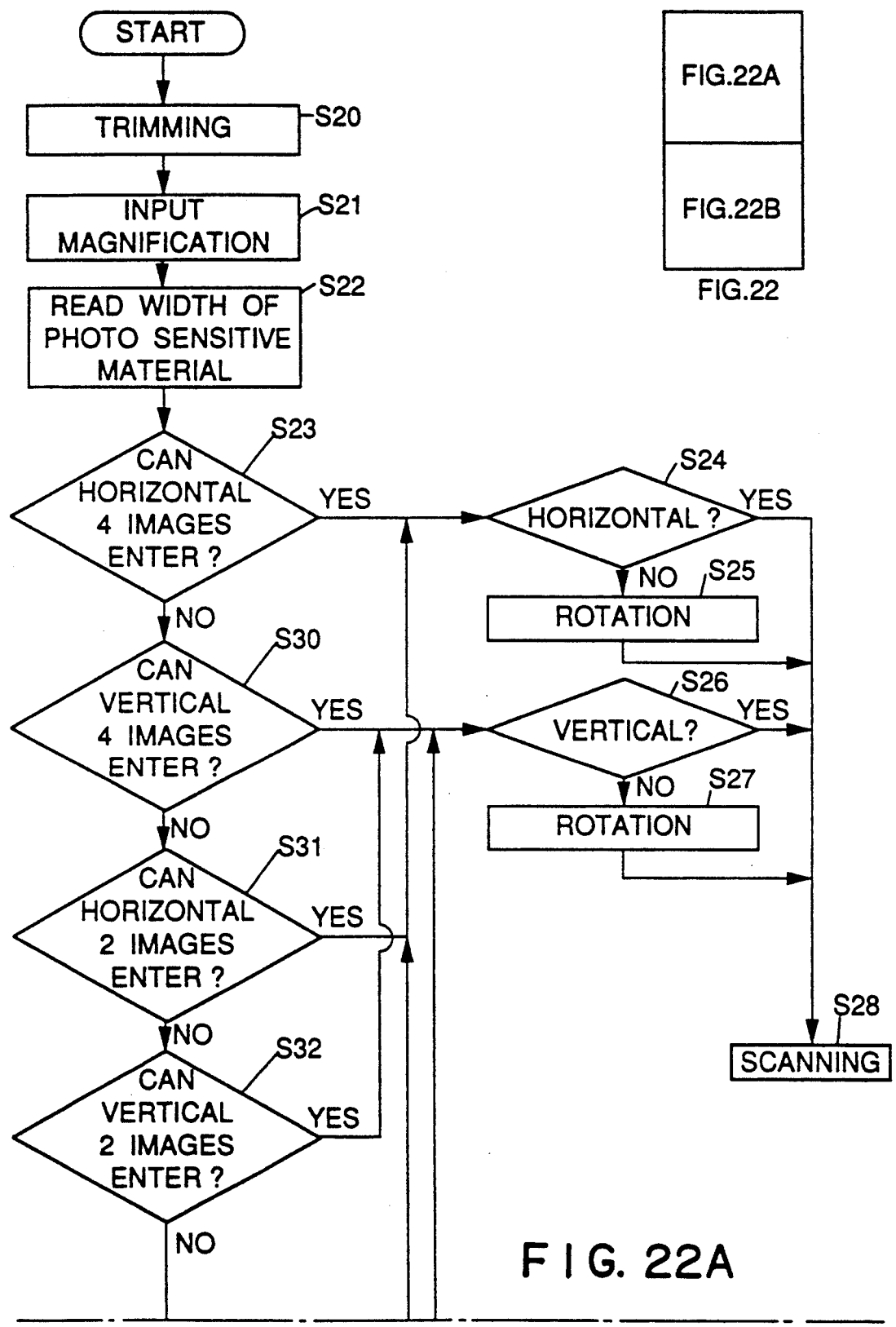
FIGS. 22A and 22B are flow charts showing an example of the image recording.
Figure 22B:
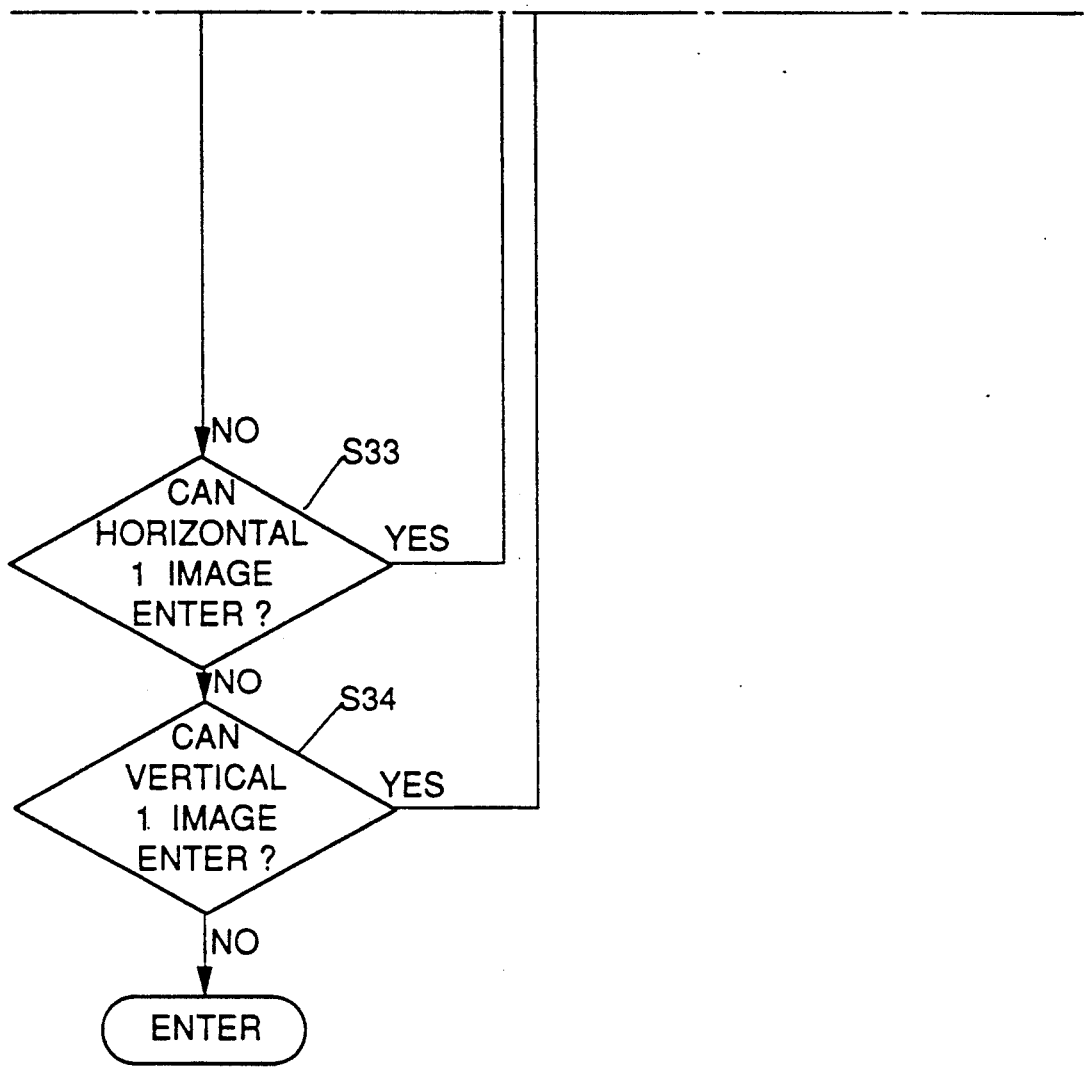

With respect to the image reading apparatus mentioned above, the reading direction (lengthwise, transverse) of the original 34 is determined by operating the apparatus according to a flow chart shown in FIGS. 22A and 22B. In detail, a trimming of the image reading apparatus in the scanner 100 is carried out by a driving of the motor 119 fixed on the original table 110 (Step S20), an output magnification is input through the keyboard 202 or other input device (Step S21), and a width (size) of the photosensitive material 503 mounted in the output unit 500 for the image output is automatically read or read with eyes and then the resultant data of the reading is input (Step S22). Then, the possibility is judged whether or not to place the output originals of C, M, Y, K in the photosensitive material 503 at their long sides in which condition the reading is carried out at the most effectively with respect to the size of the output image and width of the photosensitive material 503 (Step S23). When it is possible to enter the four output originals placed at their long sides within the area of the photosensitive material 503, it is judged that the original 34 set on the reading portion is at its long side or not (Step S24). In the case that the original 34 is placed at its long side as shown in FIG. 20 by the solid lines, the various steps or processings described above are directly carried out or the original 34 is scanned (Step S28). While, the original 34 is not placed at its long side as shown in FIG. 20 by the broken lines the motor 114 is driven to rotate by 90° (Step S25), situating it at its long side. After the above Step S25; the scanning is carried out.

If the four output originals do not enter in the area of the photosensitive material 503 at their long sides, they are further judged that alternatively, as shown in FIG. 21A (Step S30), if these four output originals can be entered, the set original 34 is judged or not at the short side (Step S26). When the original 34 is set vertically, a scanning is started directly as it is. When the original 34 is placed horizontally or at its long side, the motor 114 rotates by 90°, placing it at its short side and then starting a scanning it.

If the four output originals situated at their short sides can not vertically enter in the area of the photosensitive material 503, it is judged that only two output originals situated at their long sides as FIG. 21B can horizontally enter or not (Step S31). When it is possible, the processing returns to the Step S24 and it proceeds as previously described above. On the contrary, if it is not possible, in which case it is judged that two output originals can vertically enter or not at their short sides (Step S32). When it is possible case, the processing returns to the Step S26. When it is not possible, furthermore it is judged that only one output original at a long side can horizontally enter in the area of the photosensitive material 503 or not (Step S33). If it is not possible, it is judged that only one output original at its short side can vertically enter or not (Step S34), returning to the Step S24 or the Step S26 respectively. If only one output original at its short side can not vertically enter in the area of the photosensitive material 503, it is judged an error since such situation should not occur.

In the example of the embodiment described above, the transmission type image reading method is adopted, it is possible to adopt the reflection type image reading method.

According to the color scanner of the present invention, the original cassette holding the color original can be used without any troublesome operation of applying the originals so that whole operation of the setting method of the color scanner can be done without difficulties. Because that the input operation is carried out by a scanning, high speed inputting can be attained. Because the image reading operation of the original is carried out by the pre-scanning and the main scanning so that the condition parameters can be set and displayed on the basis of the stored pre-scanning data and the image processing is output by processing the main scanning data, it is possible to improve the productivity and workability of the scanner.

It should be understood that many modifications and adaptations of the invention will become apparent to those skilled in the art and it is intended to encompass such obvious modifications and changes in the scope of the claims appended hereto.

What is claimed is:

1. A method for producing a halftoned film or a printing plate using a color scanner of a flat bed type, where an original received on an original cassette is read optically by plane scanning and where the read data is suitably processed and recorded on a photosensitive material to make said halftoned film or said printing plate, said method comprising the steps of:
   (a) performing said plane scanning by pre-scanning for rough scanning;
   (b) storing the read data obtained from said pre-scanning in a memory portion as stored data,
   (c) displaying an image of said original obtained from said pre-scanning on a display portion,
   (d) automatically or manually setting condition parameters for data processing by using said stored data,
   (e) performing said plane scanning by main scanning for detailed scanning,
   (f) processing the read data of said main scanning on the basis of said condition parameters,
   (g) outputting an output image at a high speed by evaluating a relationship between said original and said photosensitive material so as to produce said halftoned film or said printing plate,
   (h) reading a full frame of the original cassette at a time on a fixed magnification without depending on the size of said original, and
   (i) electrically adjusting a resolution of scanning by identifying the size of said original according to a marker attached to said original cassette.

2. A method as set forth in claim 1, further including a step of automatically adjusting a magnification in response to a trimming range determined on an image frame of said pre-scanning when said main scanning is carried out.

3. A method as set forth in claim 1, wherein said displaying of the image is done on said display portion which is part of a display unit, and said condition parameters are displayed on another part thereof.

4. A method as set forth in claim 3, wherein image processing operations for a plurality of points on the image displayed in step (c) are performed by simulation so as to display the results on another part on said display unit.

5. A method as set forth in claim 4, wherein said displayed condition parameters are re-written in real-time if said condition parameters are changed, and said image is displayed by electronically enlarging the original image so as to attain a maximum resolution.

6. A method as set forth in claim 1, wherein said optical reading is performed through a slit member having different width slits, and said slit member is capable of being moved to a slit position.

7. A method as set forth in claim 6, wherein said displaying of the image is done on said display portion which is part of a display unit, and said condition parameters are displayed on another part thereof.

8. A method as set forth in claim 7, wherein image processing operations for a plurality of points on the image displayed in step (c) are performed by simulation so as to display a results on another part of said display unit.

9. A method as set forth in claim 8, wherein said displayed condition parameters are re-written in real-time if said condition parameters are changed, and said image is displayed by electronically enlarging the image so as to attain a maximum resolution.

10. A method for producing a halftoned film or a printing plate using a color scanner of a flat bed type, where an original received on an original cassette is read optically by plane scanning and where the read data is suitably processed and recorded on a photosensitive material to make said halftoned film or said printing plate, said method comprising the steps of:
(a) performing said plane scanning by pre-scanning for rough scanning,
(b) storing the read data obtained from said pre-scanning in a memory portion as stored data,
(c) displaying an image of said original obtained from said pre-scanning on a display portion,
(d) automatically or manually setting condition parameters for data processing by using said stored data,
(e) performing said plane scanning by main scanning for detailed scanning,
(f) processing the read data of said main scanning on the basis of said condition parameters, and
(g) outputting an output image at a high speed by evaluating a relationship between said original and said photosensitive material so as to produce said halftoned film or said printing plate,
wherein said displaying of the image is done on said display portion which is part of a display unit, and said condition parameters are displayed on another part thereof,
wherein image processing operations for a plurality of points on the image displayed in step (c) are performed by simulation so as to display the results on another part of said display unit, and
wherein said displayed condition parameters are re-written in real-time if said condition parameters are changed, and said image is displayed by electronically enlarging the original image so as to attain a maximum resolution.

* * * * *